United States Patent
Boecking

(10) Patent No.: US 6,725,841 B1
(45) Date of Patent: Apr. 27, 2004

(54) DOUBLE-SWITCHING CONTROL VALVE FOR AN INJECTOR OF A FUEL INJECTION SYSTEM FOR INTERNAL COMBUSTION ENGINES, WITH HYDRAULIC BOOSTING OF THE ACTUATOR

(75) Inventor: Friedrich Boecking, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 11 days.

(21) Appl. No.: 09/868,050

(22) PCT Filed: Oct. 12, 2000

(86) PCT No.: PCT/DE00/03583
§ 371 (c)(1),
(2), (4) Date: Sep. 25, 2001

(87) PCT Pub. No.: WO01/27465
PCT Pub. Date: Apr. 19, 2001

(30) Foreign Application Priority Data

Oct. 14, 1999 (DE) .......................... 199 49 528

(51) Int. Cl.$^7$ ............................................. F02M 41/00
(52) U.S. Cl. ........................................... 123/467
(58) Field of Search .................. 123/467, 446, 123/506; 239/88, 89, 96, 533.2, 533.8, 533.9, 585.1, 102.1, 102.2; 137/625.69, 625.4, 625.9

(56) References Cited

U.S. PATENT DOCUMENTS

| | | | | | |
|---|---|---|---|---|---|
| 5,893,350 | A | * | 4/1999 | Timms | 123/467 |
| 5,915,361 | A | * | 6/1999 | Heinz et al. | 123/467 |
| 6,340,018 | B1 | * | 1/2002 | Mattes | 123/467 |
| 6,446,608 | B1 | * | 9/2002 | Rizk | 123/467 |
| 6,481,419 | B2 | * | 11/2002 | Boecking | 123/467 |

FOREIGN PATENT DOCUMENTS

| | | | |
|---|---|---|---|
| DE | 19512730 | * | 8/1996 |
| DE | 197 32 802 A | | 2/1999 |
| DE | 198 60 678 A | | 7/2000 |
| DE | 19860678 | * | 7/2000 |
| EP | 0 367 114 A | | 5/1990 |

* cited by examiner

Primary Examiner—Mahmoud Gimie
(74) Attorney, Agent, or Firm—Ronald E. Greigg

(57) ABSTRACT

A control valve for injectors of injection systems for internal combustion engines is proposed, in which the final control element is actuated by an actuator via a hydraulic booster.

41 Claims, 5 Drawing Sheets

DOUBLE-SWITCHING CONTROL VALVE FOR AN INJECTOR OF A FUEL INJECTION SYSTEM FOR INTERNAL COMBUSTION ENGINES, WITH HYDRAULIC BOOSTING OF THE ACTUATOR

CROSS-REFERENCE TO RELATED APPLICATIONS

This application is a 35 USC 371 application of PCT/DE 00/03583 filed on Oct. 12, 2000.

BACKGROUND OF THE INVENTION

Field of the Invention

The invention relates to a double-switching control valve for the injector of a fuel injection system for internal combustion engines, having a final control element actuated by an actuator, wherein the final control element and a bore of a housing form a radially defined annular chamber, which on its ends has a first recess and a second recess, and the final control element is axially displaceable by means of a tappet guided in a first guide bore and has both means for sealing off the annular chamber from the first recess and means for sealing of annular chamber from the second recess.

OBJECTS AND SUMMARY OF THE INVENTION

The object of the invention is to furnish a double switching control valve for an injector of a fuel injection system which allows the metering of the tiniest preinjection quantities and which is constructed simply and compactly.

This object is attained according to the invention by a control valve for the injector of a fuel injection system for internal combustion engines, having a final control element actuated by an actuator, wherein the final control element and a bore of a housing form a radially defined annular chamber, which on its ends has a first recess and a second recess, and the final control element is axially displaceable by means of a tappet guided in a first guide bore and has both means for sealing off the annular chamber from the first recess and means for sealing off the annular chamber from the second recess, and wherein the tappet is actuated by the actuator by means of a hydraulic booster.

The control valve of the invention has the advantage that the hydraulic booster shortens the switching times. The control pressure of the injector builds up an initial tension counter to the actuation direction of the actuator, so that the hydraulic booster does not become operative until it has built up a suitable counterpressure and is already in motion. Because of the very short switching times, very small preinjection quantities can also be metered. In addition, the control valve of the invention is simple in construction and consequently compact.

Variants of the invention provide that the first recess is in communication with a fuel return, and that the second recess is in communication with a control chamber, so that the demand for driving energy for the actuator is only slight, since only during the preinjection does the actuator have to perform work counter to the hydraulic forces acting on the final control element. Furthermore, the actuator is subject only to pressure stress, which is especially advantageous when piezoelectric actuators are used.

In a feature of the invention, the face end, remote from the final control element, of the tappet and a piston actuated by the actuator define a fluid-filled pressure chamber of the hydraulic booster, so that the travel or force boosting is effected simply and with little loss.

Another variant provides that a closing spring is present, which acts on the final control element counter to the actuation direction of the actuator, so that even if pressure is absent in the control chamber, the control valve always has a defined switching position, and the sealing action in the switching position between the main injection and the preinjection is improved.

Further in the invention, it is provided that the closing spring is disposed in the second recess and is braced against a shoulder in the housing and against the final control element, so that the engineering effort and expense are low. In a further embodiment, the closing spring is disposed in a third recess, which adjoins the control chamber, and is braced via a thrust rod, guided in a second guide bore, against the final control element and a Seeger ring that is disposed in an annular groove in the third recess, so that the second recess and the diameter of the second sealing seat can be kept small.

In a further variant, it is provided that the closing spring is disposed in a third recess, which adjoins the control chamber, and is braced via a thrust rod, guided in a second guide bore, against the final control element and a control piston protruding into the control chamber, so that a closing spring with a low spring rate and a small diameter can be used.

In a further embodiment, the thrust rod has at least one longitudinally extending groove, longitudinal bore, or flat face extending essentially over the length of the thrust rod, so that a hydraulic communication exists between the control chamber and the second recess. Furthermore, by suitable dimensioning of the groove, longitudinal bore or flat face, the function of the outlet throttle can be integrated into the thrust rod.

In one version of the invention it is provided that the final control element has a collar disposed coaxially to the longitudinal axis of the tappet, and that the means for sealing off the annular chamber from the second recess and/or the means for sealing off the annular chamber from the first recess have a frustoconical sealing cone disposed coaxially to the longitudinal axis of the tappet, so that over the entire service life of the control valve, good sealing action is achieved.

Further in the invention, the second sealing cone is part of a sleeve disposed coaxially to the longitudinal axis of the final control element, facilitating assembly, and the sleeve is also centered by the tappet.

A variant provides that the end face of the sleeve toward the final control element is smooth, and that the end face of the final control element toward the sleeve is smooth, so that the sleeve is centered not by the control piston but rather by the second sealing seat, and the sealing cone of the sleeve rests in the best possible way on the sealing face in the housing. The aforementioned smooth end faces furthermore seal off the annular chamber from the control chamber.

In a further feature of the invention, it is provided that the end face of the sleeve toward the final control element and the end face of the final control element toward the sleeve are frustoconical, so that the sleeve is centered by the tappet. Furthermore, the aforementioned end faces seal the annular chamber off from the control chamber.

In a further feature of the invention, the sleeve is separably joined to the final control element, so that assembly is simplified and there is no need to split the housing.

Another variant provides that the final control element is embodied spherically, and that the means for sealing off the annular chamber from the second recess and/or the means for sealing off the annular chamber from the first recess are sealing lines extending over the spherical surface, so that an especially compact, simple construction is achieved. Furthermore, the first guide bore and the first and second sealing seat need not be precisely aligned, since the spherical valve member centers itself.

In addition, between the bore and both of the first and second recesses, sealing faces are embodied, which cooperate with the means for sealing off the annular chamber from the first recess and/or the means for sealing off the annular chamber from the second recess, so that a still further improved sealing is achieved.

Further in the invention, it is provided that the housing is embodied in one piece, so that the number of sealing faces is reduced.

In one embodiment of the invention, the control valve is operated as a 2/3-way control valve, so that the metering of the tiniest preinjection quantities is improved, and at the same time large main injection quantities become possible.

In a variant of the invention, the actuator is a piezoelectric actuator, so that major forces and a rapid response are assured.

Further in the invention, it is provided that the injection system is a common rail injection system, so that the advantages of the control valve of the invention also benefit these injection systems.

The object stated above is also attained by an injector for a fuel injection system for internal combustion engines, having a control chamber controlled by a control valve, wherein the control valve has a final control element actuated by an actuator, wherein the final control element and a bore of a housing form a radially defined annular chamber, which on its ends has a first recess and a second recess, and the final control element is axially displaceable by means of a tappet guided in a first guide bore and has both means for sealing off the annular chamber from the first recess and means for sealing off the annular chamber from the second recess, and wherein the tappet is actuated by the actuator by means of a hydraulic booster.

The control valve of the invention has the advantage of shortened switching times. The control pressure of the injector builds up an initial tension counter to the actuation direction of the actuator, so that the hydraulic booster does not become operative until it has built up a suitable counterpressure and is already in motion. Because of the very short switching times, very small preinjection quantities can also be metered. In addition, the control valve of the invention is simple in construction and consequently compact.

BRIEF DESCRIPTION OF THE DRAWINGS

Further features and advantages and of the invention can be learned from the ensuing description, in conjunction with the drawing, in which.

DESCRIPTION OF THE PREFERRED EMBODIMENTS

Figure 1:
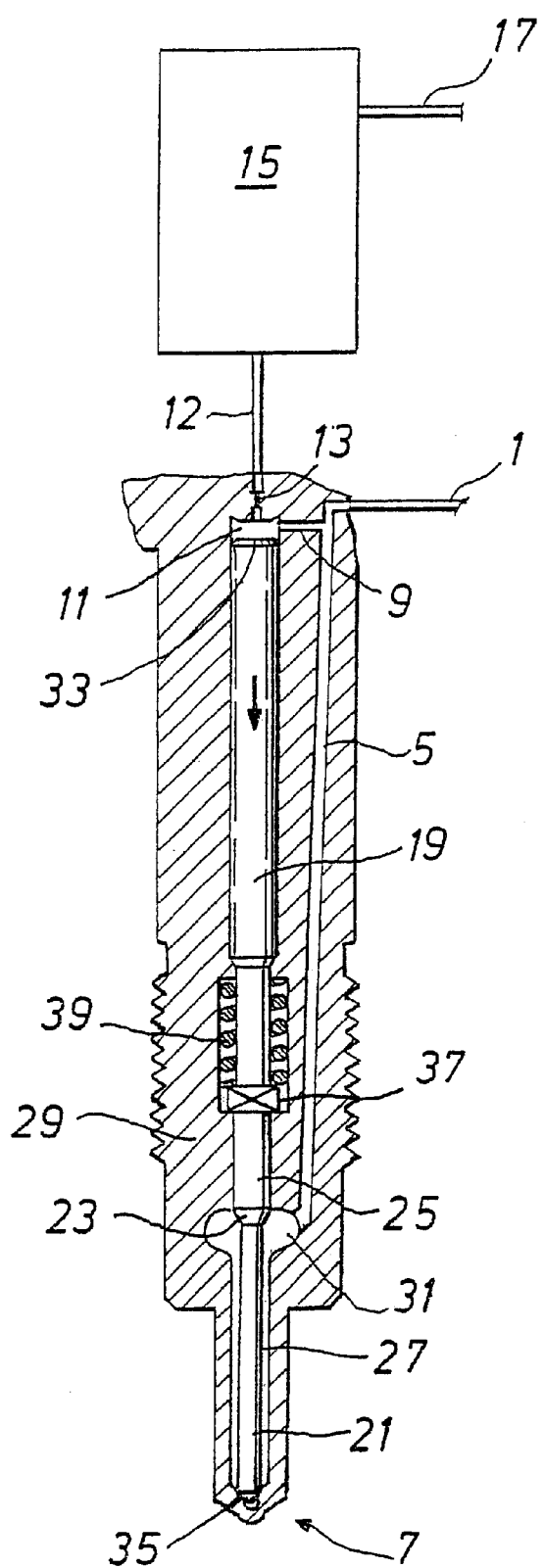
FIG. 1 is a sectional view of an injector for a fuel injection system, with a control valve shown schematically.

In FIG. 1, an injector of the invention is shown in which, via a high-pressure connection 1, fuel is carried via an injector 5 to an injection nozzle 7 and via an inlet throttle 9 into a control chamber 11. The control chamber 11 communicates with a fuel return 17 via an outlet conduit 12 and an outlet throttle 13, which throttle can be opened by a control valve 15.

The control chamber 11 is defined by a control piston 19. Adjoining the piston 19 is a nozzle needle 21, which prevents the fuel, which is under pressure, from flowing into the combustion chamber, not shown, between injections. The nozzle needle 21 has a cross-sectional change 23 from a large diameter 25 to a smaller diameter 27. With its larger diameter 25, the nozzle needle 21 is guided in a housing 29. The cross-sectional change 23 defines a pressure chamber 31 of the injection nozzle 7.

When the outlet throttle 13 is closed, the hydraulic force acting on an end face 33 of the valve piston 19 is greater than the hydraulic force acting on the cross-sectional change 23, since the area of end face 33 of the the annular area of the cross-sectional change 23. As a consequence, the nozzle needle 21 is pressed into a nozzle needle seat 35 and seals off the inlet conduit from the combustion chamber, not shown.

When the high-pressure pump, not shown, of the fuel injection system is not driven, which is because the engine is stopped, then a nozzle spring 39, acting on a shoulder 37 of the nozzle needle 21, closes the injection nozzle 7 or injector.

When the outlet throttle 13 or the control valve 15 is opened, the pressure in the control chamber 11 drops, and thus the hydraulic force acting on the end face 33 of the control piston 19 also drops. As soon as this hydraulic force is less than the hydraulic force acting on the cross-sectional change 23, the nozzle needle 21 opens, so that the fuel can reach the combustion chamber through the injection ports, not shown. The indirect triggering of the nozzle needle 21 via a hydraulic force booster system is necessary since the forces required for fast opening of the nozzle needle 21 cannot be generated directly by the control valve 15. The so-called "control quantity" required for this in addition to the fuel quantity injected into the combustion chamber reaches the fuel return 17 via the inlet throttle 9, control chamber 11, and control valve 15.

In addition to the control quantity, leakage also occurs at the nozzle needle guide and the valve piston guide. The control and leakage quantities can amount to as much as 50 $mm^3$ per stroke. These quantities are returned to the fuel tank, not shown, again via the fuel return 17. Between injections, the outlet throttle 13 is closed by the control valve.

Figure 2:
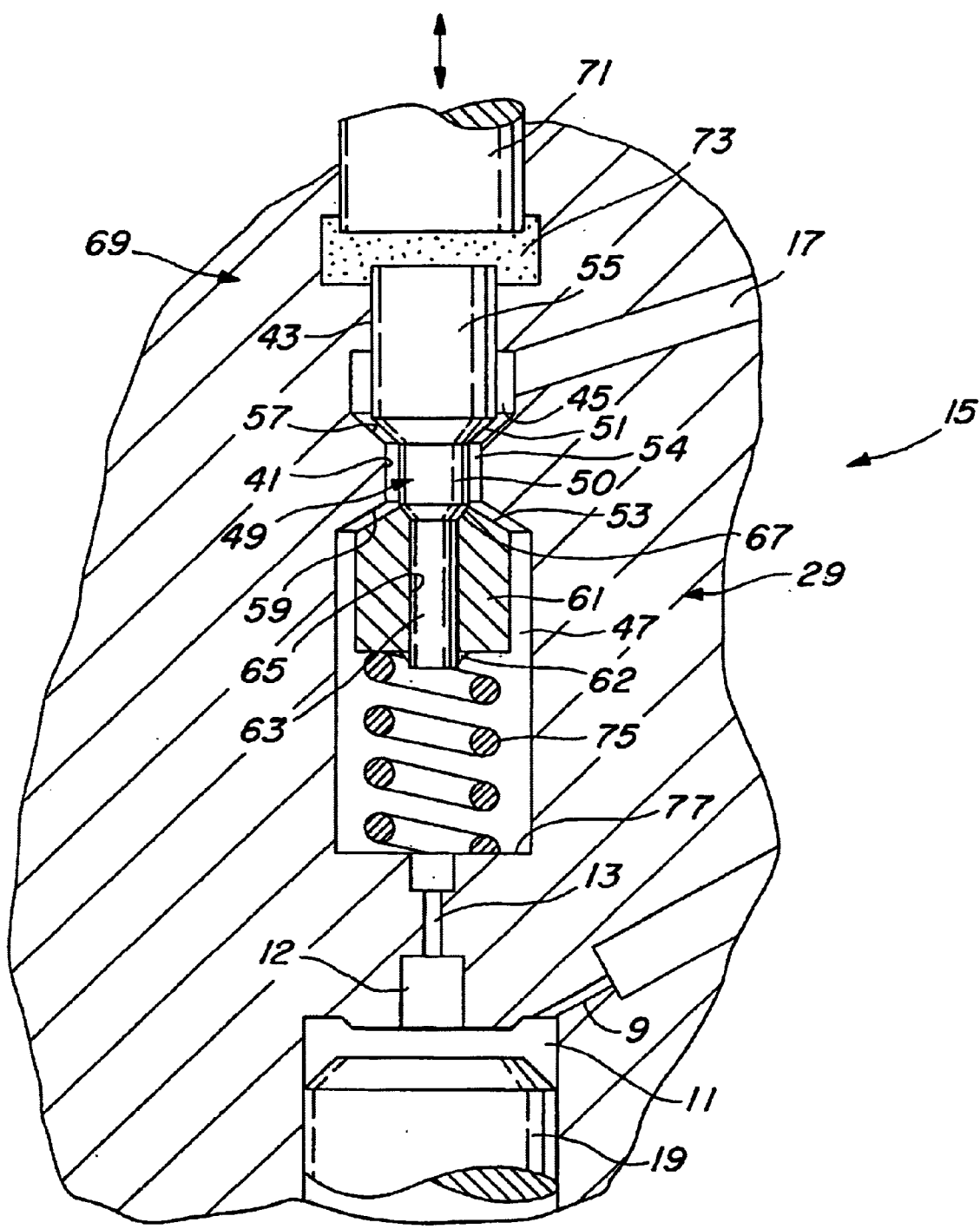
FIG. 2 is a fragmentary sectional view of a first embodiment of a control valve of the invention.

FIG. 2 shows a first embodiment of a control valve of the invention. A bore 41 is provided in the housing 29. There is a first guide bore 43 coaxial with the bore 41. The bore 41, on its ends, has a first recess 45 and a second recess 47. The final control element 49 has a collar 50 and a first sealing cone 51 and a second sealing cone 53. The bore 41 and the collar 50 form an annular chamber 54.

A tappet 55 that is joined to the final control element 49 is guided in the first guide bore 43.

The bore 41 has a smaller diameter than the first guide bore 43. The transition between the tappet 55 and the collar 50 is formed by a truncated cone embodied as the first sealing cone 51. Between the bore 41 and the first recess 45, a first sealing seat 57 is embodied in the housing 29; with the first sealing cone 51, this sealing seat can hydraulically disconnect the annular chamber 54 from the first recess 45. The second sealing cone 53, together with a second sealing seat 59 disposed between the bore 41 and the second recess 47 can disconnect the annular chamber 54 from the second recess 47.

The second sealing cone 53 is part of a sleeve 61. The sleeve 61 can be joined to the collar 50 via a weld seam 62 via a peg 63. Alternatively, the sleeve 61 can be joined to the collar by screws or a groove in the peg 63 and by a Seeger ring.

In the embodiment shown, the end face of the collar 50 and a corresponding end face 67 of the sleeve 61 are frustoconical, so that the sleeve is centered. At the same time, sealing occurs between the sleeve 61 and the portion of the final control element 47 forming the annular chamber 54.

Alternatively, especially if the sleeve 61 is screwed to the collar 50, the sealing face can be smooth, so that the sleeve 61 is centered not by the collar 50 but by the second sealing seat 59. This is made easier if there is play between the peg 63 and a center bore 65 of the sleeve 61.

It can also be seen in FIG. 2 that the second recess communicates with the control chamber 11 via an outlet conduit 12 and an outlet throttle 13, and that the first recess 45 communicates with the fuel return 17. Alternatively, by suitable dimensioning, the annular chamber 54 can take over the function of the outlet throttle 13.

The control valve is actuated by an actuator, not shown, that acts on the tappet 55 via a hydraulic booster 69. The actuator is connected to a piston 71, which exerts pressure on the fluid located in the pressure chamber 73 of the booster 69. If the actuator is a piezoelectric actuator, then the actuator can exert major forces over a short distance. In this case, the configuration shown for the booster is appropriate, where the piston 71 has a larger diameter than the tappet 55. If the actuator functions electromagnetically, for instance, then small forces can be transmitted over a long distance. In that case, it is recommended that the diameter of the piston 71 be selected as smaller than that of the tappet 55.

Figure 5:
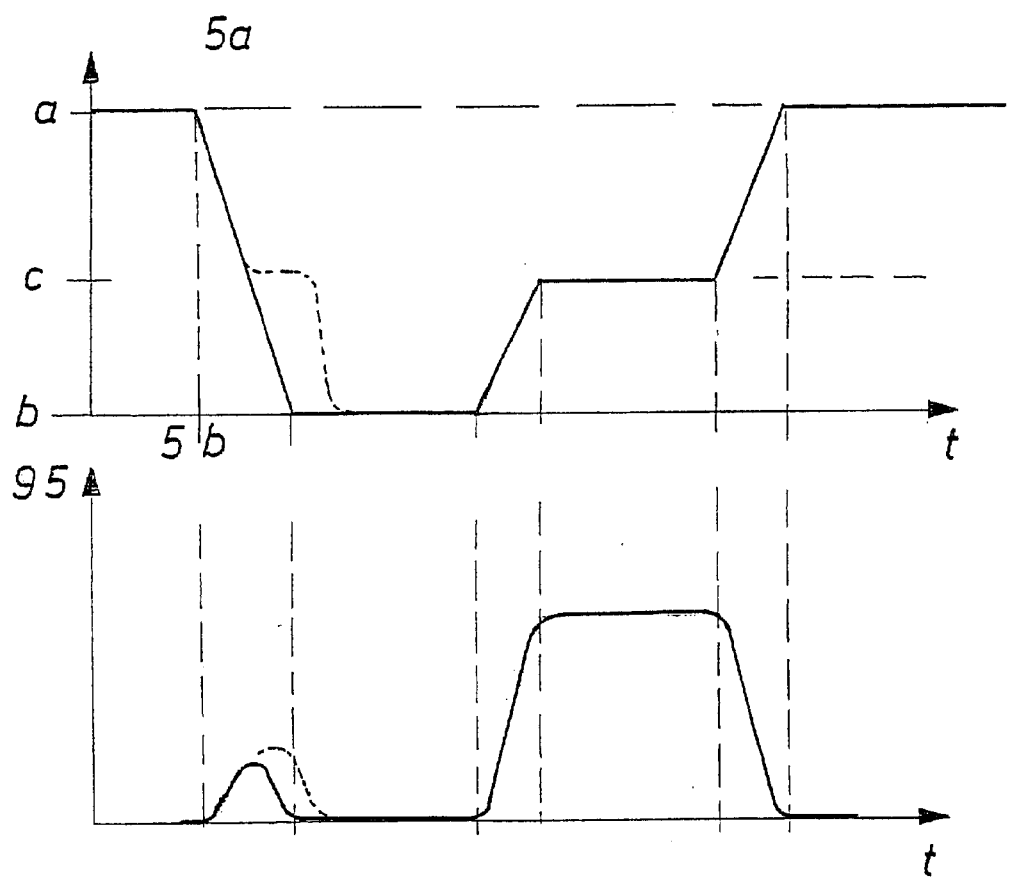

A closing spring 75 disposed in the second recess 47 is braced on one side against a shoulder 77 of the housing 29 and on the other side against the sleeve 61. By means of the closing spring 75, it is assured that even if pressure is absent in the control chamber 11, the final control element 49 will be moved into the first switching position a (FIG. 5). Furthermore, the actuator is subjected only to pressure stress, which is important especially when piezoelectric actuators are used, since such actuators function reliably only in response to pressure.

The control valve of the invention is used as a rule in the form of a 2/3-way control valve. In the first switching position a, the second recess 47 is hydraulically disconnected from the annular chamber 54. In the second switching position b, the first recess 45 is hydraulically disconnected from the annular chamber 54.

In both switching positions a and b, the control chamber 11 is disconnected from the fuel return 17; that is, the injection nozzle 7 is closed. At the transition from the first switching position a to the second switching position b, a hydraulic communication briefly exists between the control chamber 11 and the fuel return 17; that is, the pressure in the control chamber 11 at least partly collapses, and the injection nozzle 7 briefly opens. This brief opening is utilized for a preinjection. The preinjection quantity and duration can be fixed structurally with high replicability by means of the design of the actuator and the outlet throttle 13, or annular chamber 54. In the third switching position c, the final control element 49 assumes an intermediate position, in which the first and second sealing cones 51 and 53 do not rest on the first or second sealing seat 57, 59. This switching position C trips the main injection.

Figure 3:
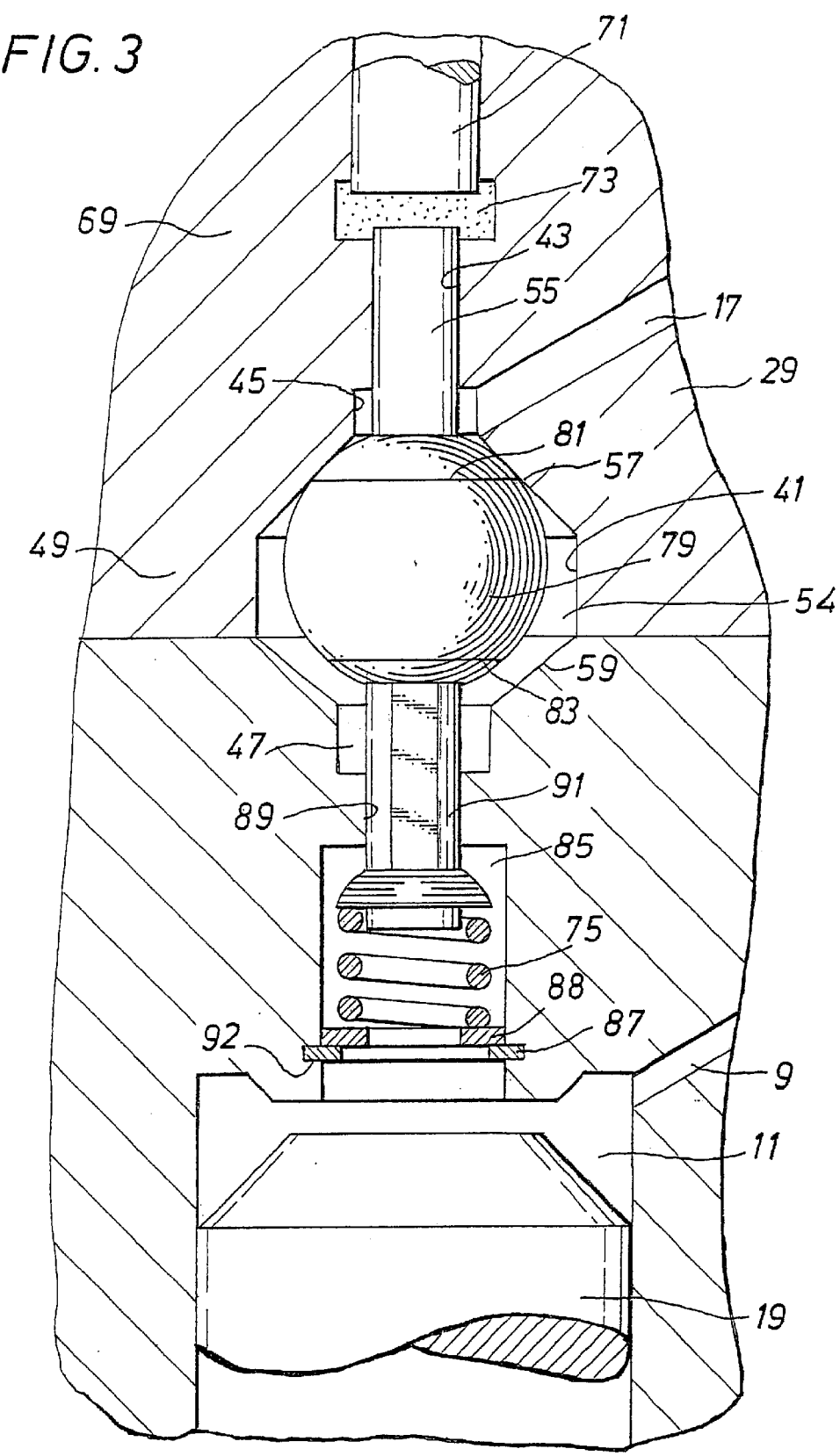
FIG. 3 is a view similar to FIG. 2, showing a second embodiment of a control valve of the invention.

In FIG. 3, a second embodiment of the invention is shown. Identical elements have been identified by the same reference numerals. Below, only the differences between the embodiments of FIGS. 2 and 3 will be addressed.

The final control element 49 comprises a ball 79. Together with the first and second sealing seats 57 and 59, this produces a first sealing line 81 and a second sealing line 83 on the ball 79. The first sealing line 81 and second sealing line 83 can have different diameters from one another. The result is different hydraulic closing forces originating from the pressure in the control chamber 11. If the tappet 55 and the final control element 49 are not solidly joined together, then the final control element 49 can center itself, regardless of whether the longitudinal axes of the first and second sealing cones 51 and 53 and of the first guide bore 43 coincide; as a result, the sealing action is always good, and the production cost drops.

The closing spring 75 is disposed in a third recess 85 that adjoins the control chamber 11. The closing spring is braced on one side via a Seeger ring 87 and a disk 88 and on the other side via a thrust rod 91, guided in a second guide bore 89 in the housing 29, against the ball 79. The Seeger ring 87 is in turn disposed in an annular groove 92 in the third recess 85. To establish the hydraulic communication between the control chamber 11 or third recess 85, and the second recess 47, flat faces are present in the thrust rod 91. Alternatively, grooves or bores, not shown, can also be provided in the thrust rod 91. By suitable dimensioning of the flat faces, grooves or bores, these features can take over the function of the outlet throttle 13.

Figure 4:
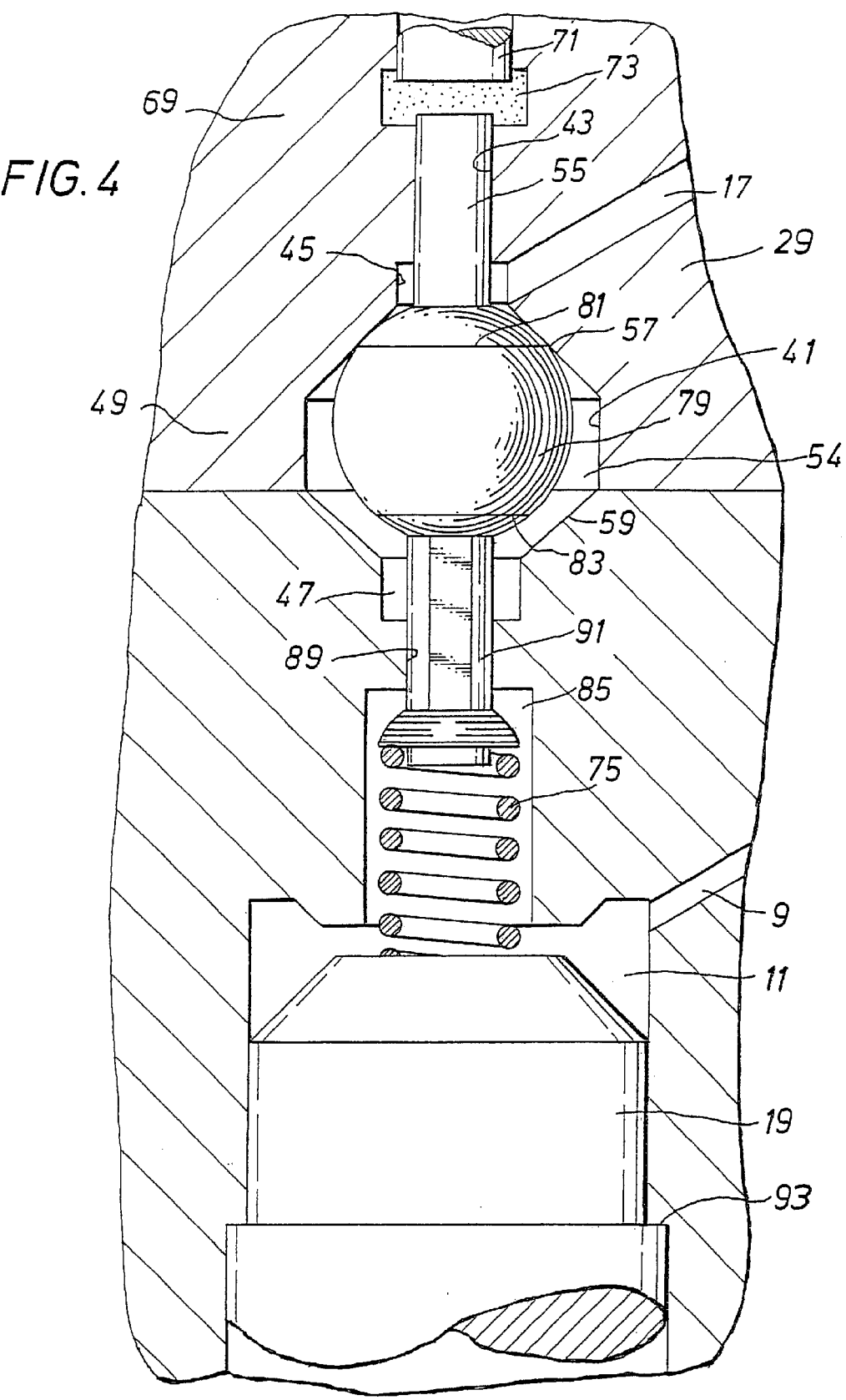
FIG. 4 is a view similar to FIGS. 2 and 3 and showing a third embodiment of a control valve of the invention and FIG. 5 is a graph of the course over time of an injection.

FIG. 4 shows a further embodiment according to the invention, in which the closing spring 75 is braced on one side against the valve piston 19. It can also be seen in FIG. 4 that the motion of the valve piston 19 in the direction of the control valve 15 is limited by a stroke stop 93 in such a way that a communication always exists between the inlet throttle 9 and the second recess 47.

FIG. 5 shows the course over time of the stroke 95 of the nozzle needle 21, as a function of the three switching positions a, b and c. In both graphs 5a and 5b, the time t is plotted on the abscissa. The ordinate in graph 5a shows the switching positions a, b, and c of the control valve, while the ordinate in graph 5b shows the stroke 95 of the nozzle needle 21.

Beginning at the first switching position a, the control valve 15 is moved by the actuator into the second switching position b. During the transition between the two switching positions, the nozzle needle 21 opens slightly. As a result, the preinjection quantity is injected into the combustion chamber. To increase the preinjection quantity, the control valve 15 can also briefly remain in the third switching position c during the preinjection. This variant is represented by the dashed lines.

The main injection effected by controlling the control valve to move from the second switching position b into the third switching position c. This switching position is maintained until such time as the requisite injection quantity has been injected. After that the main injection is terminated by moving the control valve into the first switching position a. This sequence also makes a further advantage of the control valve of the invention clear: The actuator has to perform work counter to the pressure in the control chamber 11 only at the transition from the first switching position a to the second switching position b, so that the demand for driving energy is very low. Furthermore, the dropping pressure in the control chamber during this transition leads to a low demand for performance.

The foregoing relates to preferred exemplary embodiments of the invention, it being understood that other variants and embodiments thereof are possible within the spirit and scope of the invention, the latter being defined by the appended claims.

I claim:

1. In a control valve for the injector of a fuel injection system for internal combustion engines, having a final control element (49) actuated by an actuator, wherein the final control element (49) and a bore (41) of a housing (29) form a radially defined annular chamber (54), which on its ends has a first recess (45) and a second recess (47), and the final control element (49) is axially displaceable by means of a tappet (55) guided in a first guide bore (43) and has both means (51, 81) for sealing off the annular chamber (54) from the first recess (45) and means (53, 83) for sealing off the annular chamber (54) from the second recess (47), the improvement wherein the tappet (55) is actuated by the actuator by means of a hydraulic booster (69).

2. The control valve of claim 1, wherein the first recess (45) is in communication with a fuel return (17).

3. The control valve of claim 1, wherein the second recess (47) is in communication with a control chamber (11).

4. The control valve of claim 1, wherein the face end, remote from the final control element (49), of the tappet (55) and a piston (71) actuated by the actuator define a fluid-filled pressure chamber (73) of the hydraulic booster (69).

5. The control valve of claim 1, wherein a closing spring (75) is present, which acts on the final control element (49) counter to the actuation direction of the actuator.

6. The control valve of claim 5, wherein the closing spring (75) is disposed in the second recess (47) and is braced against a shoulder (77) in the housing (29) and against the final control element (49).

7. The control valve of claim 5, wherein the closing spring (75) is disposed in a third recess (85), which adjoins the control chamber (11), and is braced via a thrust rod (91), guided in a second guide bore (89), against the final control element (49) and a Seeger ring (87) that is disposed in an annular groove (92) in the third recess (85).

8. The control valve of claim 5, wherein the closing spring (75) is disposed in a third recess (85), which adjoins the control chamber (11), and is braced via a thrust rod (91), guided in a second guide bore (89), against the final control element (47) and a control piston (19) protruding into the control chamber (11).

9. The control valve of claim 5, wherein the thrust rod (91) has longitudinally extending grooves, longitudinal bores, or flat faces extending essentially over the length of the thrust rod (91).

10. The control valve of claim 1, wherein the final control element (49) has a collar (50) disposed coaxially to the longitudinal axis of the tappet (55), and that the means (53) for sealing off the annular chamber (54) from the second recess (47) and/or the means (51) for sealing off the annular chamber from the first recess (45) have a frustoconical sealing cone (51, 53) disposed coaxially to the longitudinal axis of the tappet (55).

11. The control valve of claim 10, wherein the second sealing cone (53) is part of a sleeve (61) disposed coaxially to the longitudinal axis of the final control element (49).

12. The control valve of claim 11, wherein the end face (67) of the sleeve (61) toward the final control element (49) is smooth, and that the end face of the final control element (49) toward the sleeve (61) is smooth.

13. The control valve of claim 11, wherein the end face (67) of the sleeve (61) toward the final control element (49) and the end face of the final control element (49) toward the sleeve (61) are frustoconical.

14. The control valve of claim 11, wherein the sleeve (61) is separably joined to the final control element (49).

15. The control valve of claim 1, wherein the final control element (49) is embodied spherically, and that the means for sealing off the annular chamber (54) from the second recess (47) and/or the means for sealing off the annular chamber (54) from the first recess (45) are sealing lines (81, 83) extending over the spherical surface.

16. The control valve of claim 1, wherein between the bore (41) and both of the first and second recesses (45, 47), sealing faces (57, 59) are embodied, which cooperate with the means (51, 81) for sealing off the annular chamber (54) from the first recess (45) and/or the means (53, 83) for sealing off the annular chamber (54) from the second recess (47).

17. The control valve of claim 1, wherein the housing (29) is embodied in one piece.

18. The control valve of claim 1, wherein the control valve (15) is a 2/3-way control valve.

19. The control valve of claim 1, wherein the actuator is a piezoelectric actuator.

20. The control valve of claim 1, wherein the injection system is a common rail injection system.

21. The control valve of claim 2, wherein the second recess (47) is in communication with a control chamber (11).

22. The control valve of claim 2, wherein the face end, remote from the final control element (49), of the tappet (55) and a piston (71) actuated by the actuator define a fluid-filled pressure chamber (73) of the hydraulic booster (69).

23. The control valve of claim 3, wherein the face end, remote from the final control element (49), of the tappet (55) and a piston (71) actuated by the actuator define a fluid-filled pressure chamber (73) of the hydraulic booster (69).

24. The control valve of claim 2, wherein a closing spring (75) is present, which acts on the final control element (49) counter to the actuation direction of the actuator.

25. The control valve of claim 3, wherein a closing spring (75) is present, which acts on the final control element (49) counter to the actuation direction of the actuator.

26. The control valve of claim 4, wherein a closing spring (75) is present, which acts on the final control element (49) counter to the actuation direction of the actuator.

27. The control valve of claim 6, wherein the thrust rod (91) has longitudinally extending grooves, longitudinal bores, or flat faces extending essentially over the length of the thrust rod (91).

28. The control valve of claim 7, wherein the thrust rod (91) has longitudinally extending grooves, longitudinal bores, or flat faces extending essentially over the length of the thrust rod (91).

29. The control valve of claim 8, wherein the thrust rod (91) has longitudinally extending grooves, longitudinal bores, or flat faces extending essentially over the length of the thrust rod (91).

30. The control valve of claim 12, wherein the sleeve (61) is separably join ed to the final control element (49).

31. The control valve of claim 13, wherein the sleeve (61) is separably joined to the final control element (49).

32. The control valve of claim 23, wherein the final control element (49) is embodied spherically, and that the means for sealing off the annular chamber (54) from the second recess (47) and/or the means for sealing off the annular chamber (54) from the first recess (45) are sealing lines (81, 83) extending over the spherical surface.

33. The control valve of claim 24, wherein the final control element (49) is embodied spherically, and that the means for sealing off the annular chamber (54) from the second recess (47) and/or the means for sealing off the annular chamber (54) from the first recess (45) are sealing lines (81, 83) extending over the spherical surface.

34. The control valve of claim 9, wherein the final control element (49) is embodied spherically, and that the means for sealing off the annular chamber (54) from the second recess (47) and/or the means for sealing off the annular chamber (54) from the first recess (45) are sealing lines (81, 83) extending over the spherical surface.

35. The control valve of claim 2, wherein between the bore (41) and both of the first and second recesses (45, 47), sealing faces (57, 59) are embodied, which cooperate with the means (51, 81) for sealing off the annular chamber (54) from the first recess (45) and/or the means (53, 83) for sealing off the annular chamber (54) from the second recess (47).

36. The control valve of claim 3, wherein between the bore (41) and both of the first and second recesses (45, 47), sealing faces (57, 59) are embodied, which cooperate with the means (51, 81) for sealing off the annular chamber (54) from the first recess (45) and/or the means (53, 83) for sealing off the annular chamber (54) from the second recess (47).

37. The control valve of claim 2, wherein the housing (29) is embodied in one piece.

38. The control valve of claim 2, wherein the control valve (15) is a 2/3-way control valve.

39. The control valve of claim 2, wherein the actuator is a piezoelectric actuator.

40. The control valve of claim 2, wherein the injection system is a common rail injection system.

41. An injector for a fuel injection system for internal combustion engines, having a control chamber (11) controlled by a control valve (15), wherein the control valve (15) has a final control element (49) actuated by an actuator, wherein the final control element (49) and a bore (41) of a housing (29) form a radially defined annular chamber (54), which on its ends has a first recess (45) and a second recess (47), and the final control element (49) is axially displaceable by means of a tappet (55) guided in a first guide bore (43) and has both means (51, 81) for sealing off the annular chamber (54) from the first recess (45) and means (53, 83) for sealing off the annular chamber (54) from the second recess (47), the improvement wherein the tappet (55) is actuated by the actuator by means of a hydraulic booster (69).

* * * * *